United States Patent
Keitel et al.

(10) Patent No.: US 9,452,557 B2
(45) Date of Patent: Sep. 27, 2016

(54) HOT RUNNER SYSTEM

(71) Applicant: Otto Männer Innovation GmbH, Bahlingen (DE)

(72) Inventors: Ralph Keitel, Algolsheim (FR); Swen Spuller, Forschheim (DE); Gheorghe George Olaru, Freiburg (DE); Marco Herdel, Ihringen (DE); Faimund Friderich, Sasbach (DE)

(73) Assignee: Otto Männer Innovation GmbH, Bahlingen (DE)

(*) Notice: Subject to any disclaimer, the term of this patent is extended or adjusted under 35 U.S.C. 154(b) by 102 days.

(21) Appl. No.: 14/470,107

(22) Filed: Aug. 27, 2014

(65) Prior Publication Data

US 2015/0014887 A1   Jan. 15, 2015

Related U.S. Application Data

(63) Continuation of application No. PCT/EP2013/000572, filed on Feb. 27, 2013.

(30) Foreign Application Priority Data

Feb. 27, 2012 (DE) .................. 10 2012 003 574

(51) Int. Cl.
  *B29C 45/28* (2006.01)
  *B29C 45/27* (2006.01)

(52) U.S. Cl.
  CPC ....... *B29C 45/2806* (2013.01); *B29C 45/2725* (2013.01); *B29C 45/281* (2013.01); *B29C 45/2735* (2013.01); *B29C 2045/282* (2013.01); *B29C 2045/2813* (2013.01); *B29C 2045/2824* (2013.01); *B29C 2045/2831* (2013.01); *B29C2045/2834* (2013.01); *B29C 2045/2837* (2013.01)

(58) Field of Classification Search
  None
  See application file for complete search history.

(56) References Cited

U.S. PATENT DOCUMENTS

| 4,212,627 A | 7/1980 | Gellert |
| 4,330,258 A | 5/1982 | Gellert |

(Continued)

FOREIGN PATENT DOCUMENTS

| DE | 3140165 | 4/1982 |
| DE | 3840099 | 6/1989 |
| DE | 19956215 | 6/2001 |
| DE | 102011106606 | 12/2012 |
| EP | 0790116 A2 | 8/1997 |
| EP | 1712341 A2 | 10/2006 |
| GB | 2085350 A | 4/1982 |
| WO | 2006080807 | 8/2006 |

OTHER PUBLICATIONS

E-Drive User Manual, Mold-Masters, Copyright 2010.
(Continued)

*Primary Examiner* — Jill Heitbrink
(74) *Attorney, Agent, or Firm* — McAndrews Held & Malloy, Ltd.

(57) ABSTRACT

A valve gated hot runner system that includes a single movable plate (or movable frame) that retains multiple valve pins. A linear actuator is coupled to rigid transmission elements that convey a linear motion from the actuator to several rotary components via a direct or indirect contact between at least a portion of the rigid transmission elements and the rotary components. The rigid transmission elements and the rotary components are connected to a common plate. The rotary components are further coupled to the movable plate (frame) and through their full rotation or turning lift or translate the movable plate (frame) with the valve pins to open and close the communication between hot runner nozzles and corresponding mold cavities. The actuator can be electrical, electro-magnetic, pneumatic or hydraulic.

11 Claims, 16 Drawing Sheets

(56) References Cited

U.S. PATENT DOCUMENTS

| | | |
|---|---|---|
| 4,497,621 A | 2/1985 | Kudert et al. |
| 4,787,840 A | 11/1988 | Gellert |
| 5,894,023 A | 4/1999 | Schramm et al. |
| 6,113,381 A | 9/2000 | Gellert et al. |
| 7,766,646 B2 | 8/2010 | Feick et al. |
| 7,815,431 B2 | 10/2010 | Gunther |
| 7,866,975 B2 | 1/2011 | Gunther |
| 2006/0257521 A1 | 11/2006 | Spuller |
| 2009/0100962 A1 | 4/2009 | Uracz et al. |

OTHER PUBLICATIONS

English translation of the International Preliminary Report on Patentability mailed Sep. 12, 2014 in International Application No. PCT/EP2013/000572.

HOT RUNNER SYSTEM

RELATED APPLICATIONS

This application claims the benefit of priority to international application PCT/EP2013/000572 filed Feb. 27, 2013 which claims the benefit of priority to German Application No. 10 2012 003 574.8 filed Feb. 27, 2012 the disclosures of which are incorporated herein by reference in their entirety as if fully set forth herein.

FIELD

The present invention relates to hot runner systems for injection molding and associated methods for injection molding. More particularly, the present invention relates to valve gated hot runner systems using movable plates and associated methods for injection molding using such plates.

BACKGROUND

Hot runner systems using a common plate to actuate valve pins are known. In some documents these plates are called synchro-plates. In some cases one synchro plate may be used to actuate all the valve pins and in some other cases several plates may be used to actuate clusters of valve pins in a synchronized manner. By using such plates all of the valve pins or just several valve pins are moved simultaneously into the known open position and closing position. This ensures that equal amounts of a molten material are delivered into at least two mold cavities having the same volume. This also means that the mold may have mold cavities of the same volume to form identical parts or the mold may have clusters of mold cavities having equal or unequal volumes to form parts having different volumes that are called family mold cavities.

There is a need to better control the movement of the plates retaining the valve pins, especially to make sure that there is no delay between the movement of the plate and the actual movement of the actuators that drive the plate. This is a problem when belts or other non-rigid elements are used to convey the movement from the actual actuator There is also a need to prevent or minimize any deformations of the elements that provide connections between the plate and the actuator of the plate to ensure long life of the system and faster cycle time.

SUMMARY

In an embodiment of the invention a valve gated hot runner systems includes a single movable plate (or movable frame) that retains multiple valve pins. A linear actuator is coupled to rigid transmission elements that convey a linear motion from the actuator to several rotary components via a direct or indirect contact between at least a portion of the rigid transmission elements and the rotary components. The rigid transmission elements and the rotary components are connected to a common plate. The rotary components are further coupled to the movable plate (frame) and through their full rotation or turning lift or translate the movable plate (frame) with the valve pins to open and close the communication between hot runner nozzles and corresponding mold cavities.

In an embodiment of the invention the rigid elements are gear racks and the rotary elements are gear pinions engaged to each other.

In an embodiment of the invention the rigid elements are levers and thrust rods and the rotary elements are gears.

In an embodiment of the invention the rotary elements are ball screws.

In an embodiment of the invention the rotary elements are cam-tracks.

In an embodiment of the invention the valve pins have a cylindrical section on their free end allowing the valve pin to enter into the mold cavity outlet openings (or mold gate orifice) with accurate alignment at different locations relative to the mold cavity. In an embodiment of the invention each valve pin has at least two tips corresponding to two separate mold cavity outlet openings.

In an embodiment of the invention each nozzle has at least two separate valve pins that are used to inject into two separate mold cavities, the two valve pins being movable in different directions.

In an embodiment of the invention it is thereby advantageously possible for the support plate on the motion converter devices to be supported against the mounting at a distance from the edge of the support plate so that also in the case of large support plates comprising a plurality of valve pins and/or adjusting means, flexural deformations of the support plate can be largely prevented when quickly opening and closing the hot runner nozzles. Thus, a large number of valve pins can be synchronously displaced together at high dynamics with just one actuating drive. Since the sliding mechanism and the motion converter device exhibiting the inclined planes enable a mechanically stable or rigid drive connection between the actuating drive and the support plate, the linear movement produced by means of the actuating drive can be transmitted uniformly to the individual motion converter devices and from these to the spaced-apart positions of the support plate. A simultaneous opening and closing of all of the valve pins is thus possible even given highly dynamic displacing of the valve pins.

In an embodiment of the invention, the actuator is designed as an electric motor and/or controllable by means of a suitable drive control device such that the valve pins can be positioned in at least one third position disposed between a first position and a second position and can be held as needed in said third position. The valve pins can then be brought as needed into the at least one third position during the injection molding process in order to better control the melt flow. The valve pins can thus be axially displaced in controlled manner. The hot runner nozzles can thus have a relatively small open cross section in e.g. the third position such that the melt can be injected into the mold cavity at a high flow rate, which has the advantage of high frictional heat simultaneously developing in the nozzle opening which benefits and sustains the flow process. When the mold cavities are almost full of injection molding material and it begins on the one hand to solidify and on the other to shrink, however, a dwell pressure phase can be initiated in which the valve pins retract and the open cross section thereby enlarges so that despite the now less favorable conditions, injection molding material can be re-pressed.

In an embodiment of the invention, the valve pins comprise a cylindrical section at their respective free end region distant from the support plate which preferably interacts in each case with a respectively corresponding valve seat of the respective hot runner nozzle such that it is closed in both the second position as well as in the third position of the valve pins. Prior to the molded parts being removed from the mold cavities, the valve pins can then be moved back into the third position from their closed position or final position respectively in which they are arranged in the second position in which they protrude somewhat into the mold cavity in order for the molded parts to then be removed from the mold cavities. This thus prevents the valve pins from coming into contact with the molded parts when they are being removed from the molds and leaving marks on the surfaces of the molded parts. The positioning of the valve pins in the at least three different positions additionally affords a clean gate mark.

In an embodiment of the invention, at least two hot runner nozzles have outlet openings pointing in different directions and valve pins pointing in different directions, wherein said valve pins are in drive connection with an adjusting means such that the closing force is transmittable from the adjusting means to the valve pins. It is thereby possible to simultaneously displace a plurality of valve pins with one adjusting means. The valve pins are thereby arranged transverse and in particular at right angles to the adjusting means. The adjusting means can be of pin or rod configuration.

In an embodiment of the invention, the reciprocating apparatus on the mounting comprises a third rotary element in drive connection with the first thrust rod rotatably mounted about a third axis and a fourth rotary element in drive connection with the second thrust rod rotatably mounted about a fourth axis such that the third and fourth axes are in each case at a parallel distance to the first and second axes and the third rotary element is in drive connection by way of a third motion converter device comprising at least one third inclined plane and the fourth rotary element is in drive connection by way of a fourth motion converter device comprising at least one fourth inclined plane with the support plate. The support plate can thus also be connected to the mounting by means of at least four spindle drives, whereby an even greater number of valve pins can be displaced simultaneously.

In some embodiments of the invention the thrust rods are designed as gear racks and the rotary elements as gear pinions engaged with same. Even more compact dimensions are thus enabled with the actuating device.

In some embodiments of the invention, each individual rotary element is connected to its respectively associated thrust rod at a point distanced from its axis by means of a slotted guide system and/or a pivot bearing extending transverse to the sliding direction. The actuating device can thus be manufactured economically.

In some embodiments of the invention the motion converter devices are configured as ball screws. The support plate can then be displaced at low friction. This is particularly advantageous in the case of a larger support plate displaced by just one electric motor.

In some embodiments of the invention, the rotary elements are arranged between the thrust rods. The space between the rotary elements can then be used for the mounting so that it can be of correspondingly stable configuration.

In some embodiments_the individual ball screws each comprise a recirculating ball spindle fixedly connected to the support plate and a recirculating ball nut arranged thereon which is rotatably mounted to the mounting about its axis and non-rotatably fixed to its associated rotary element. The support plate can then be easily mounted to the mounting when the actuating device is assembled or after service or maintenance work being performed by the support plate plane of extension first being aligned parallel to the mounting or perpendicular to the axes of the recirculating ball spindles and then screwed to the recirculating ball spindles.

In some embodiments of the invention it is convenient for cooperating conical centering means to be provided on the recirculating ball spindle on the one hand and on the support plate on the other, whereby the individual recirculating ball spindles are each screwed to the support plate by means of a screw or screw nut. The support plate can then be easily mounted to the recirculating ball spindles by the cooperating centering means being respectively positioned so as to lay flat against each other. The recirculating ball spindles are then screwed to the support plate by the screws and/or screw nuts, whereby the screws and/or screw nuts are preferably tightened at a predetermined torque. The centering means are preferably designed such that all the torque acting on the recirculating ball spindles upon tightening the screws and/or screw nuts is wholly applied to the support plate so that the recirculating ball spindles cannot turn with the screws and/or screw nuts. Advantageously, the torque acting on the recirculating ball spindles during operation of the actuating device is directly applied to the support plate by the centering means so that the screws and/or screw nuts cannot disengage.

In an embodiment of the invention, the actuating drive comprises an electric motor having a stator connected to the mounting and a rotor, wherein the rotor is in drive connection with the sliding mechanism by means of a further ball screw. The rotation of the rotor can thereby be converted into the linear movement at low friction. The electric motor can particularly be a servomotor and preferentially a torque motor. If necessary, the electric motor can be designed and/or controllable by an applicable drive control device such that the valve pins can be positioned into at least one intermediate position disposed between their open and their closed position.

In some embodiments of the invention, the sliding mechanism comprises a cross bar connecting the first thrust rod and the second thrust rod together in a U-shape, wherein the actuating drive engages the cross bar to displace the sliding mechanism. This results in a simple and symmetrical structure in which the linear movement of the actuating drive can be uniformly transmitted to the two thrust rods.

In some embodiments of the invention the mounting can comprise at least one plate or one frame.

In accordance with the invention there is provided a hot runner system (100) for simultaneous injection molding of a plurality of parts in separate mold cavities (78, 79), comprising:
an injection molding manifold (7) having an inlet opening (19) for receipt of the injection fluid,
a plurality of nozzles (8) communicating with one or more flow channels in the manifold (7), each nozzle having a valve pin (2) for controlling the flow of melt from the nozzles (8) to one or more mold cavities (78, 79),
a support plate (11) or a support frame that supports the plurality of valve pins (2) or adjusters for the valve pins (2), said support plate (11) or support frame being movable along a first direction in order to simultaneously move the valve pins (2) or adjusters (86) relative to the one or more mold cavities (78, 79),
an actuator (12) for displacing the support plate (11) or support frame and for generating a valve pin (2) closing force along a first direction toward the one or more mold cavities (78, 79), said actuator (12) comprising a torque generating structure (59) having an electrical component (32), a rotary mechanism (34) drivable by the electrical component (32) and a thrust arm (33) directly coupled to the rotary mechanism (34) and movable along a second direction (13),
a sliding mechanism (14, 15, 16) arranged external of the actuator (12) coupled to the thrust arm (33) of the actuator (12), wherein the sliding mechanism (14, 15, 16) is movable along the second direction (13) and interconnected to a stationary plate (5, 6) or a stationary frame, wherein the sliding mechanism (14, 15, 16) comprises rigid components in order to transmit the closing force along the second direction, an engaging or connecting mechanism (60, 61, 62, 63) directly interconnected to the sliding mechanism (14, 15, 16) and comprising at least two separate engaging or connecting structures (60, 61), a plurality of rotary mechanisms (23, 24, 25, 26) each comprising at least one rotary element (28, 29) supported on the stationary plate (5, 6) or stationary frame, wherein the rotary elements (28, 29) are interconnected to at least two engaging or connecting structures (60, 61) to convert the linear movement of the sliding mechanism (14, 15, 16) into a plurality of simultaneous rotary movements in order to direct the closing force along the first direction, a reciprocating mechanism (27) fixed to the support plate (11) or support frame, wherein the reciprocating mechanism (27) is directly coupled to the rotary elements (28, 29) in order to effect movement of the support plate (11) or support frame along the first direction such that a force for simultaneous movement of the valve pins (2) or adjusters (86) along the first direction by way of the support plate (11) or the support frame can be generated by the actuator (12) and transmitted by the rigid components of the sliding mechanism (14, 15,16) via a translational movement coupled with rotation to distribute the closing force to the plurality of rotary elements (28, 29) which have rotational axes generally coaxial with an axis of the valve pins (2) or adjusters (86).

In such a system the actuator (12) is typically comprised of an electric motor or a drive control device such that the valve pins (2) can be positioned in at least one third position disposed between a first position and a second position and can be held as needed in said third position.

In such a system the valve pins (2) can include a cylindrical section at a free end region that is distant or distal relative to the support plate (11) which interacts with a corresponding valve seat (77) of a respective hot runner nozzle (8) such that flow through a nozzle is closed when an associated valve pin is disposed in either the second position or the third position of the valve pins (2).

In such a system the valve pins (2) are typically arranged in the mold cavities (78, 79) by a free end that is distant or distal relative to the support plate (11) in the second position and are arranged completely external of the mold cavities (78, 79) in the third position.

In such a system the valve pins (2) preferably each have a section which tapers, preferably conically or in cone-shaped manner, toward a free end of the valve pins (2) on a free end region distant or distal relative to the support plate (11).

In such a system at least two nozzles (8) preferably have outlet openings (80) arranged to route injection fluid along different directions and valve pins (2) that are arranged along different directions, wherein the valve pins (2) are drivably interconnected to an adjuster such that the closing force is transmittable from the adjuster to the valve pins (2).

In such a system the rotary mechanism (23, 24, 25, 26) can comprise a sleeve having a helical cam follower slot or a ball nut or a re-circulating ball nut.

In such a system the reciprocating mechanism (27) can comprise a spindle having a helical track and a ball screw.

In such a system the engaging or connecting mechanism (60, 61, 62, 63) can comprise a gear rack.

In such a system the engaging or connecting mechanism (60, 61, 62, 63) can comprise a lever arm (44-47, 54-57, 44'''-47''').

In another aspect of the invention there is provided a method of simultaneously molding a plurality of parts from two or more mold cavities, the method comprising injecting an injection fluid into the two or more mold cavities in a hot runner system comprised of:

an injection molding manifold (7) having an inlet opening (19) for the injection fluid, a plurality of nozzles (8) communicating with one or more flow channels in the manifold (7), each nozzle having a valve pin (2) for controlling the flow of melt from the nozzles (8) to one or more mold cavities (78, 79), a support plate (11) or a support frame that supports the plurality of valve pins (2) or adjusters for the valve pins (2), said support plate (11) or support frame being movable along a first direction in order to simultaneously move the valve pins (2) or adjusters (86) relative to the one or more mold cavities (78, 79), an actuator (12) for displacing the support plate (11) or support frame and for generating a valve pin (2) closing force along a first direction toward the one or more mold cavities (78, 79), said actuator (12) comprising a torque generating structure (59) having an electrical component (32), a rotary mechanism (34) drivable by the electrical component (32) and a thrust arm (33) directly coupled to the rotary mechanism (34) and movable along a second direction (13), a sliding mechanism (14, 15, 16) arranged external of the actuator (12) coupled to the thrust arm (33) of the actuator (12), wherein the sliding mechanism (14, 15, 16) is movable along the second direction (13) and interconnected to a stationary plate (5, 6) or a stationary frame, wherein the sliding mechanism (14, 15, 16) comprises rigid components in order to transmit the closing force along the second direction, an engaging or connecting mechanism (60, 61, 62, 63) directly interconnected to the sliding mechanism (14, 15, 16) and comprising at least two separate engaging or connecting structures (60, 61), a plurality of rotary mechanisms (23, 24, 25, 26) each comprising at least one rotary element (28, 29) supported on the stationary plate (5, 6) or stationary frame, wherein the rotary elements (28, 29) are interconnected to at least two engaging or connecting structures (60, 61) to convert the linear movement of the sliding mechanism (14, 15, 16) into a plurality of simultaneous rotary movements in order to direct the closing force along the first direction, a reciprocating mechanism (27) fixed to the support plate (11) or support frame, wherein the reciprocating mechanism (27) is directly coupled to the rotary elements (28, 29) in order to effect movement of the support plate (11) or support frame along the first direction such that a force for simultaneous movement of the valve pins (2) or adjusters (86) along the first direction by way of the support plate (11) or the support frame can be generated by the actuator (12) and transmitted by the rigid components of the sliding mechanism (14, 15,16) via a translational movement coupled with rotation to distribute the closing force to the plurality of rotary elements (28, 29) which have rotational axes generally coaxial with an axis of the valve pins (2) or adjusters (86).

BRIEF DESCRIPTION OF THE DRAWINGS

The following will reference the figures in describing embodiments of the invention in greater detail.

DETAILED DESCRIPTION

Figure 1:
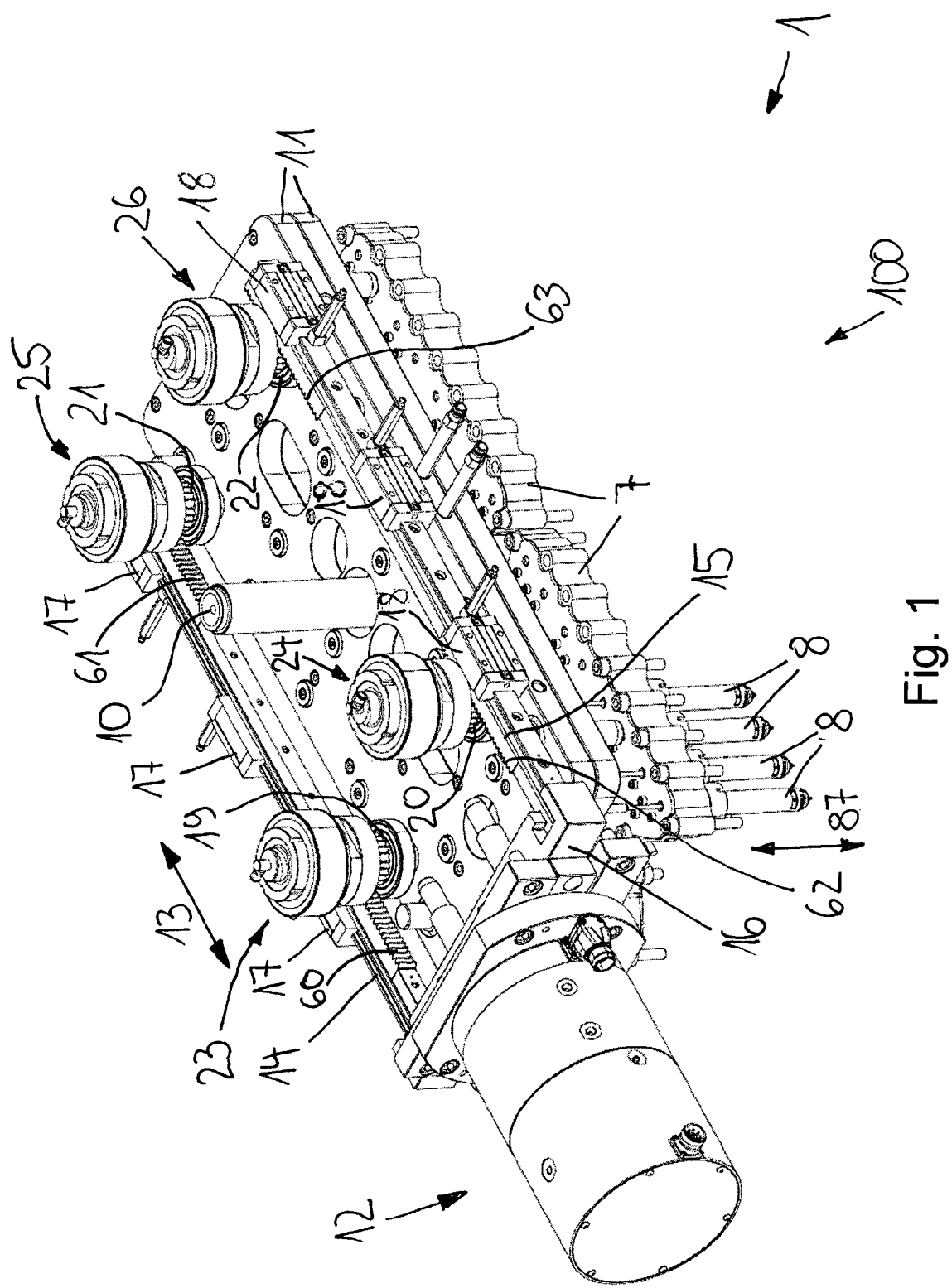
FIG. 1: is a top perspective view of an embodiment of a system according to the invention showing having actuating device for displacing pin valves using a common plate.

An actuating device for displacing valve pins 2 of a hot runner system 100 for a hot runner injection molding apparatus identified as a whole in FIG. 1 by reference numeral 1 exhibits a mounting comprising a stack of plates with a plurality of retaining plates 3, 4, 5, 6 arranged one flat on top of the other.

Figure 2:
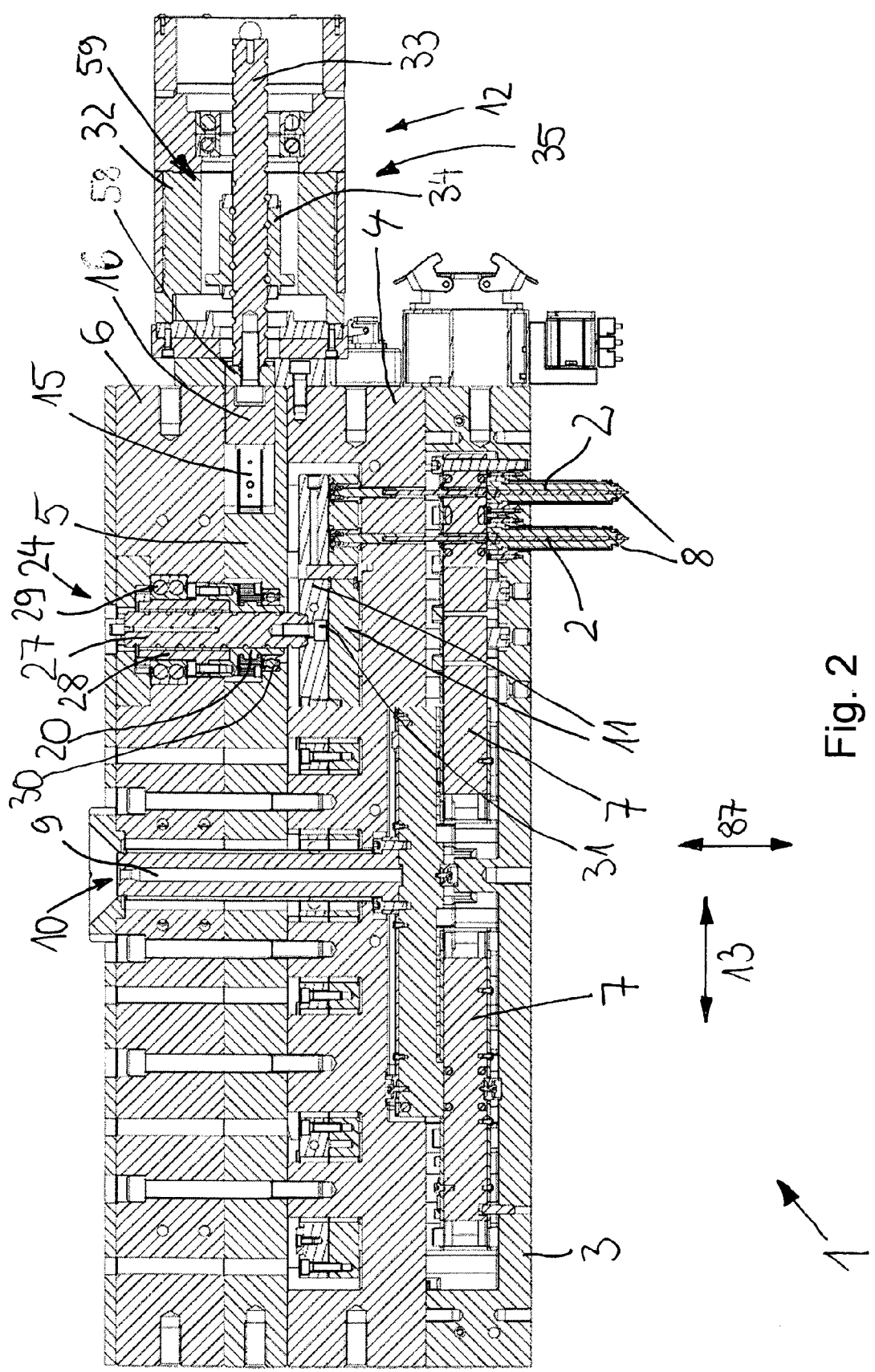
FIG. 2: is a partial longitudinal sectional view through FIG. 1 showing some of the plurality of hot runner nozzles mounted in the device.
Figure 3:
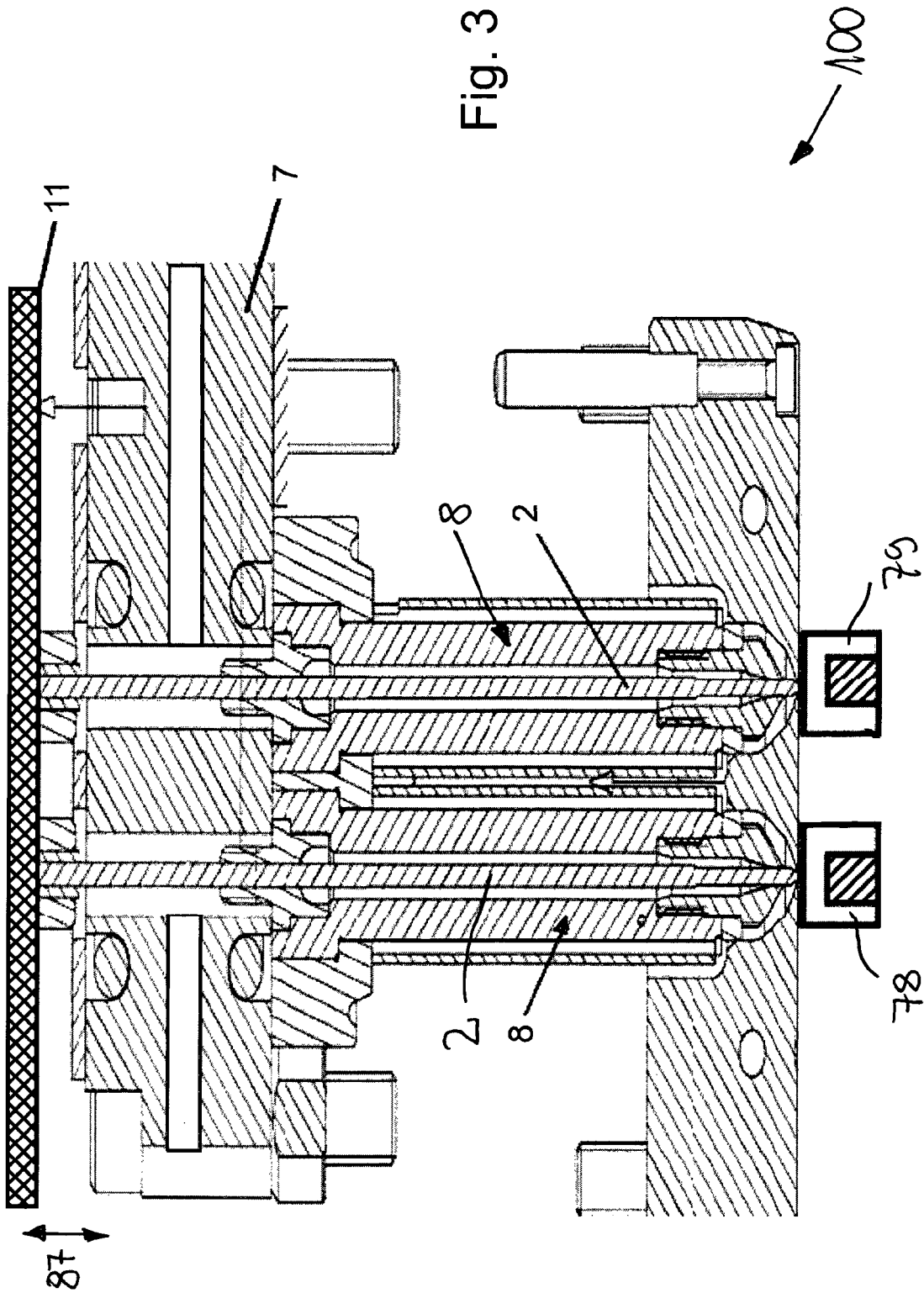
FIG. 3: is a partial longitudinal sectional view through a system according to the invention, the system showing two of a plurality of hot runner nozzles.

A cut-out is provided between a first retaining plate 3 and a second retaining plate 4 fixedly connected thereto in which a manifold 7 which is connected to a plurality of hot runner nozzles 8 is arranged. As can be seen in FIG. 2, the manifold 7 is connected to an inlet opening 10 via a feed runner 9 to which an injection nozzle of an injection molding machine can be connected which delivers a moldable melt to the manifold 7. The manifold 7 has runners leading to the hot runner nozzles 8 connected in a manner known per se to the feed runner 9. The melt can be injected into the mold cavities 78, 79 of an injection mold via hot runner nozzles 8 (FIG. 3). A separate mold cavity 78, 79 is thereby preferably allocated to each hot runner nozzle 8. The mold cavity 78, 79 is formed between mold parts 83, 84 able to be brought into an open and a closed position.

In each hot runner nozzle 8 a respective valve pin 2 of a valve gate is displaceably arranged between an open and a closed position in the axial direction of the hot runner nozzle 8. The flow of the melt can be controlled by way of the valve pins 2.

Figure 4:
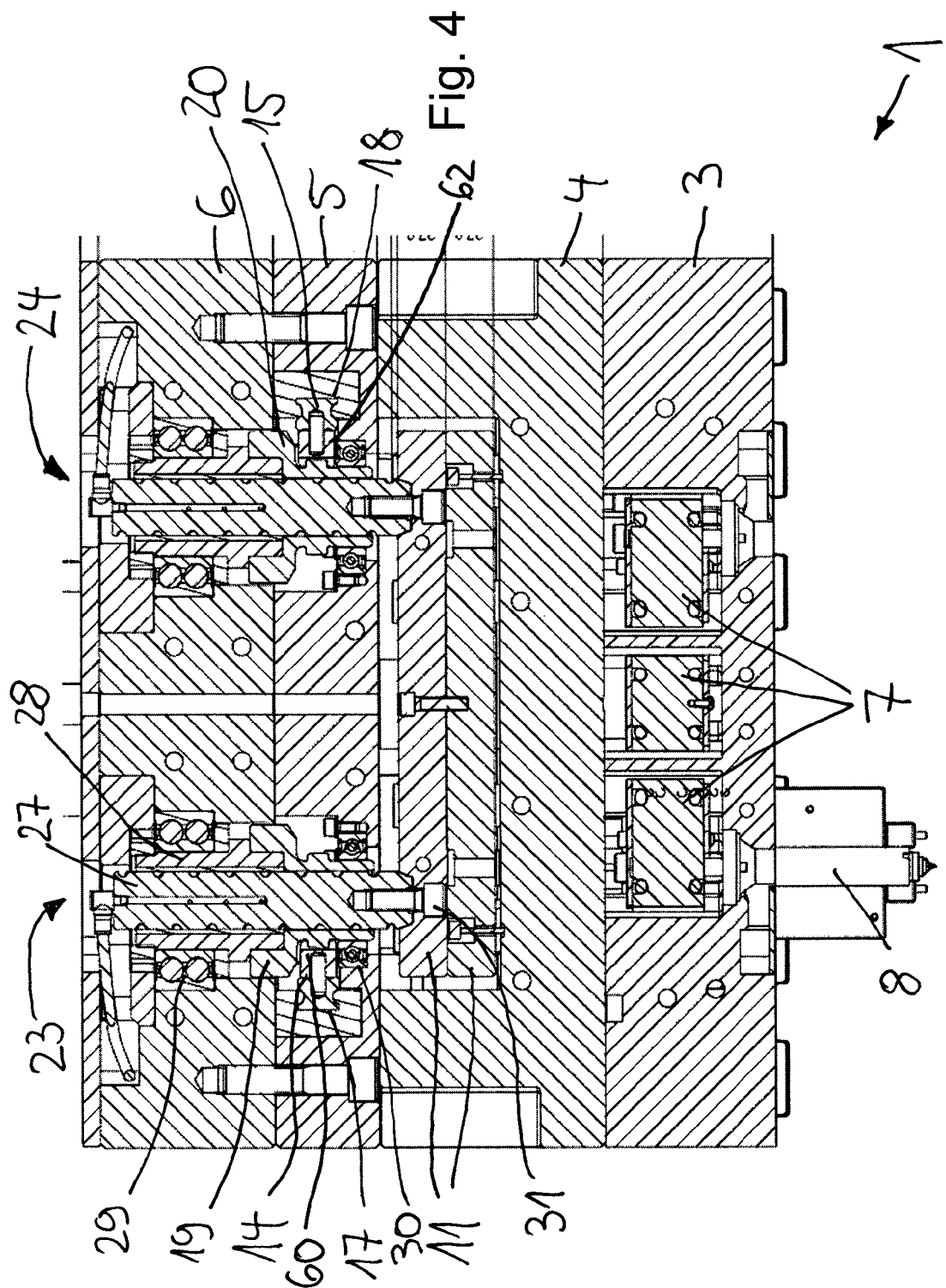
FIG. 4: is a cross-sectional view through the actuating device of the FIG. 1 system.

All of the valve pins 2 are at a parallel distance from one another and each connected to a common support plate 11 at an end section distant from their associated valve seat 77. The support plate 11 is mounted to the mounting so as to be displaceable back and forth in the axial direction of the valve pins 2 relative to the retaining plates 3, 4, 5, 6 of the mounting along a first direction 87 for the simultaneous opening and closing of the hot runner nozzles 8. FIGS. 2 and 4 show the support plate 11 in its lower position in which the valve pins 2 rest against the valve seats 77 and the outlet openings 80 of the hot runner nozzles 8 are thus closed.

To shift the valve pins 2 between the open and the closed position, the actuating device 1 has an actuating drive 12 comprising an actuating element 58 which can be moved back and forth relative to the retaining plates 3, 4, 5, 6 correspondent with a linear movement in a second direction 13 oriented transverse to the axial direction of the valve pins 2, which will hereinafter also be referred to as the sliding direction 13.

The actuating element 58 is in drive connection with a sliding mechanism comprising a first thrust rod 14 and a second thrust rod 15 distanced parallel thereto which is mounted to the mounting so as to be displaceable back and forth in the sliding direction 13. It can be seen in FIG. 5 that a third retaining plate 5 arranged adjacent to the second retaining plate 4 comprises a respective dovetail guide 17, 18 for each thrust rod 14, 15, on which the respective thrust rod 14, 15 is displaceably guided. Another suitable linear guide can also be provided instead of the dovetail guides 17, 18, particularly a recirculating ball bearing guide or a circular guide. The thrust rods 14, are designed as bending resistant elements.

In the embodiment depicted in FIGS. 1, 2 and 3-6, the thrust rods 14, 15 are fixedly connected together by means of a bending resistant cross bar 16. The actuating element 58 of the actuating drive 12 engages at the cross bar 16.

The thrust rods 14, 15 are in drive connection with the support plate 11 via a reciprocating apparatus.

The reciprocating apparatus comprises a first rotary element 19 rotatably mounted about a first axis on a fourth retaining plate 6 of the mounting in drive connection with the first thrust rod 14. As can be seen from FIGS. 1 and 4, the first thrust rod 14 is designed as a gear rack and the first rotary element 19 as a gear pinion engaged thereto.

Correspondingly, the reciprocating apparatus has a second rotary element 20 rotatably mounted about a second axis parallel to the first axis on the fourth retaining plate 6 in drive connection with the second thrust rod 15. The second thrust rod 15 is designed as a gear rack and the second rotary element 20 as a gear pinion engaged thereto.

The reciprocating apparatus further comprises a third rotary element 21 rotatably mounted about a third axis arranged parallel to the first axis on the fourth retaining plate 6 in drive connection with the first thrust rod 14 which is designed as a gear pinion engaged with the first thrust rod 14.

Correspondingly, the reciprocating apparatus comprises a fourth rotary element 2 rotatably mounted about a fourth axis arranged parallel to the first axis on the fourth retaining plate 6 in drive connection with the second thrust rod 15 which is designed as a gear pinion engaged with the second thrust rod 15.

Figure 6:
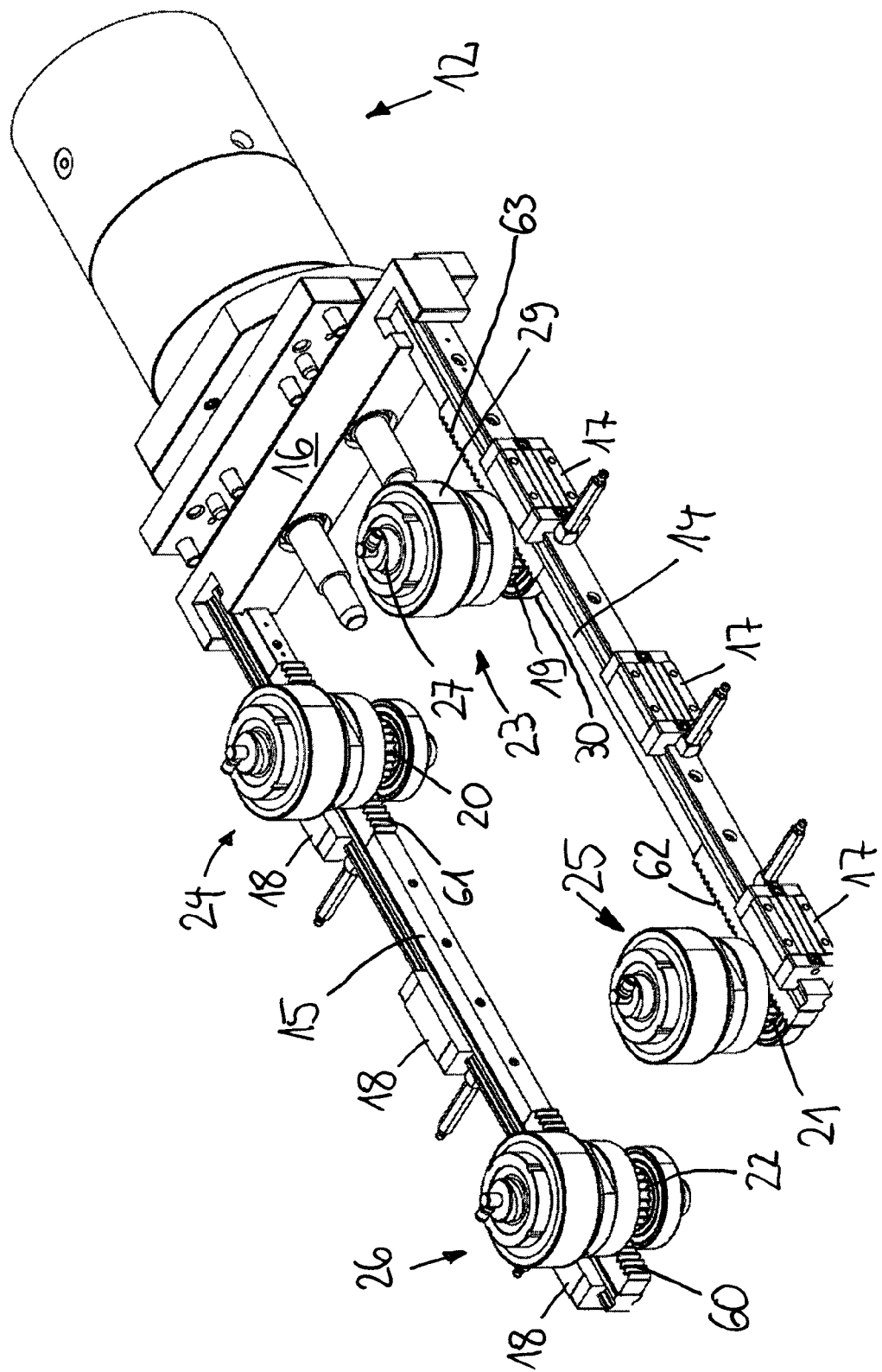
FIG. 6: is a top perspective partial view of the actuating device of the FIG. 1 system showing in particular the arrangement and configuration of racks and ball screws.

It can be recognized from FIG. 6 that the rotary elements 19, 20, 21, 22 are each respectively arranged between the thrust rods. The first axis and the fourth axis as well as the second axis and the third axis are thereby arranged point-symmetrically with respect to an axis of symmetry coinciding with roughly the central longitudinal axis of the feed runner.

Figure 7:
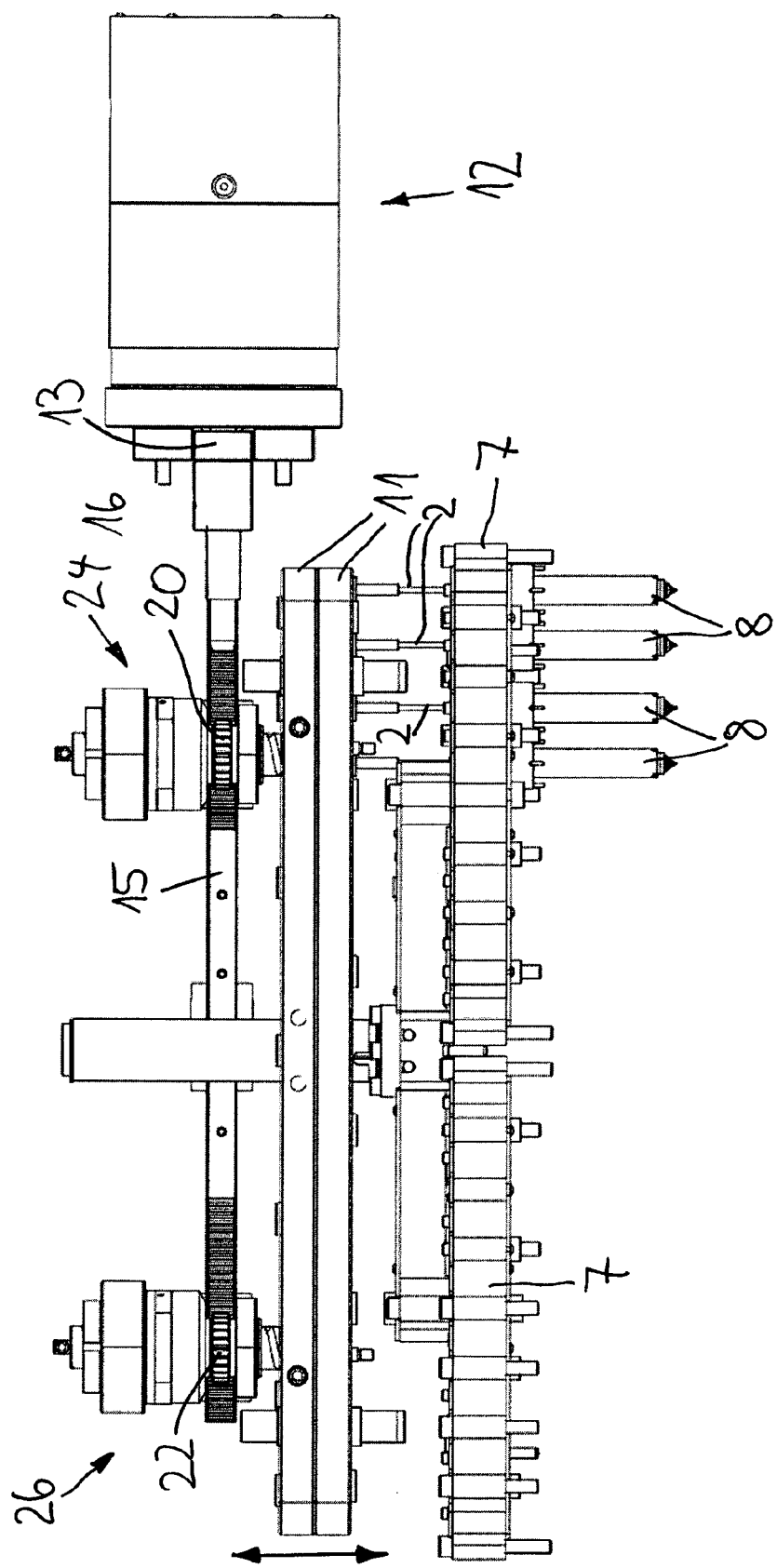
FIG. 7: is a partial side view of the actuating device of the FIG. 1 system depicting a support plate displaceable by means of electrically driven gear racks and ball screws and a manifold for melt distribution disposed downstream of the plate.

The first rotary element 19 is in drive connection with the support plate 11 via a first motion converter device 23, as is the second rotary element 20 via a second motion converter device 24, the third rotary element 21 via a third motion converter device 25, and the fourth rotary element 22 via a fourth motion converter device 26 (FIG. 7). The motion converter devices 23, 24, 25, 26 are each designed as ball screws which deflect the translational motion of the thrust rods 14, 15 by 90° in the axial direction of the valve pins 2.

Figure 5:
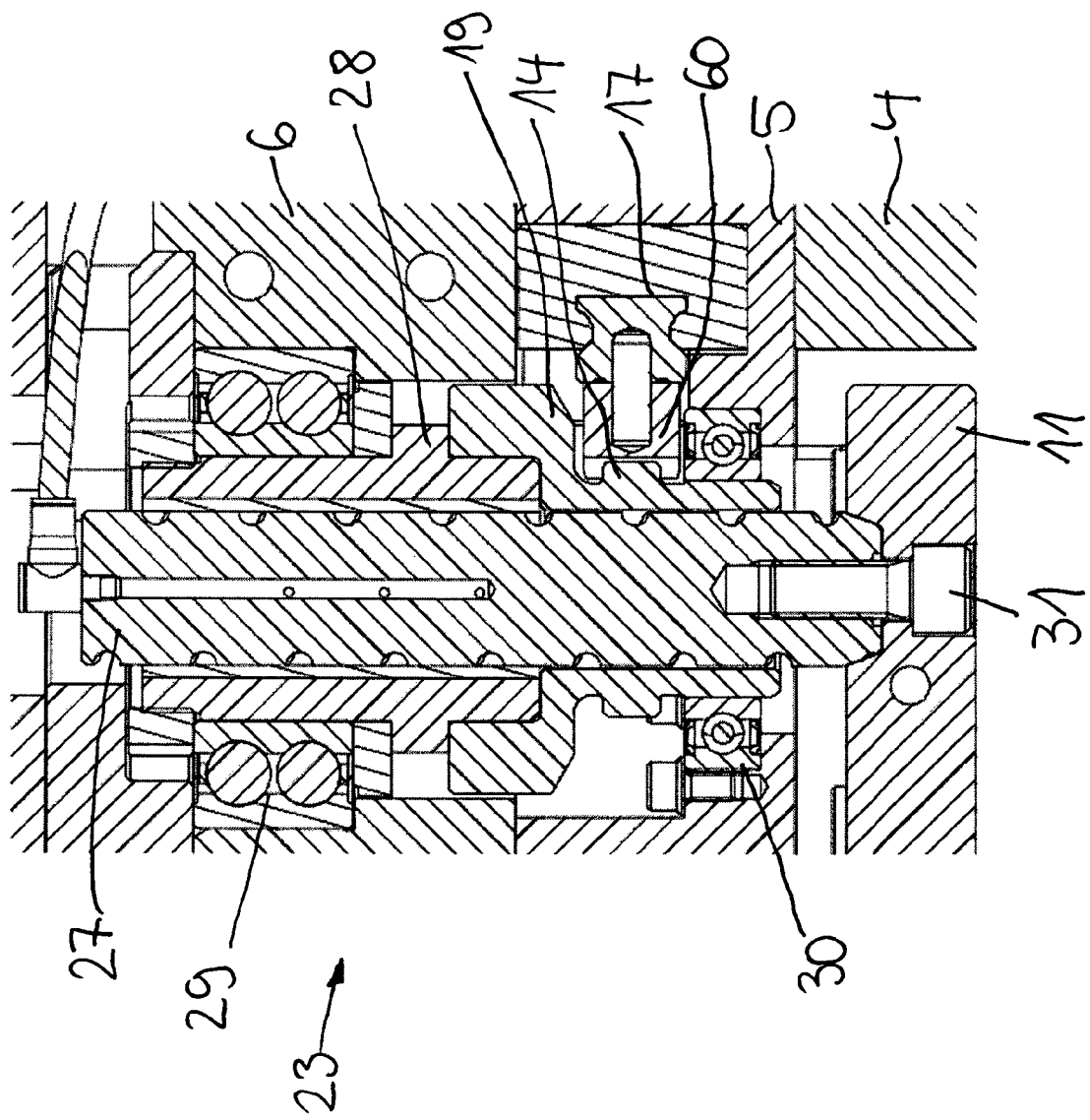
FIG. 5: is a partial cross-sectional view through the actuating device of the FIG. 1 system showing a ball screw.

Recognizable from FIG. 5 is that the first motion converter device 23 comprises a recirculating ball spindle 27 fixedly connected to the support plate 11 and recirculating ball nut 28 disposed thereon which is rotatably mounted on the fourth retaining plate 6 about the first axis by means of a first roller bearing 29. Bearing balls not shown in any greater detail in the figure are arranged between the recirculating ball spindle 27 and the recirculating ball nut 28 which can move along helical inclined planes orbiting the recirculating ball spindle 27 which extend along a closed trajectory at the lateral surface of the recirculating ball spindle 27 and the inner wall of the recirculating ball nut 28.

The recirculating ball nut 28 is non-rotatably fixed to the first rotary element 19 which is rotatably mounted to the third retaining plate 5 about the first axis by means of a second roller bearing 30.

The configuration of the second, third and fourth motion converter devices 24, 25, 26 corresponds to the configuration of the first motion converter device 23, hence the description of motion converter devices 24, 25, 26 provided there applies analogously When the thrust rods 14, 15 by means of the actuating drive are displaced in sliding direction 13 relative to the retaining plates 3, 4, 5, 6, the rotary elements 19, 20, 21, 22 and the recirculating ball nuts 28 of the motion converter devices 23, 24, 25, 26 rotate about their respective axes, whereby the recirculating ball spindles 27 and the support plate 11 fixedly connected thereto are displaced in the axial direction of the valve pins 2 relative to retaining plates 3, 4, 5, 6 and the valve seats 77 fixedly connected thereto.

It is recognizable from FIG. 5 that an outer cone is provided on the recirculating ball spindle 27 and a corresponding inner cone on the support plate 11. The recirculating ball spindle 27 is fixed to the support plate 11 by means of a screw 31 at least partially passing through the support plate 11 which is screwed to a threaded hole positioned on the face of the recirculating ball spindle 27.

Figure 8:
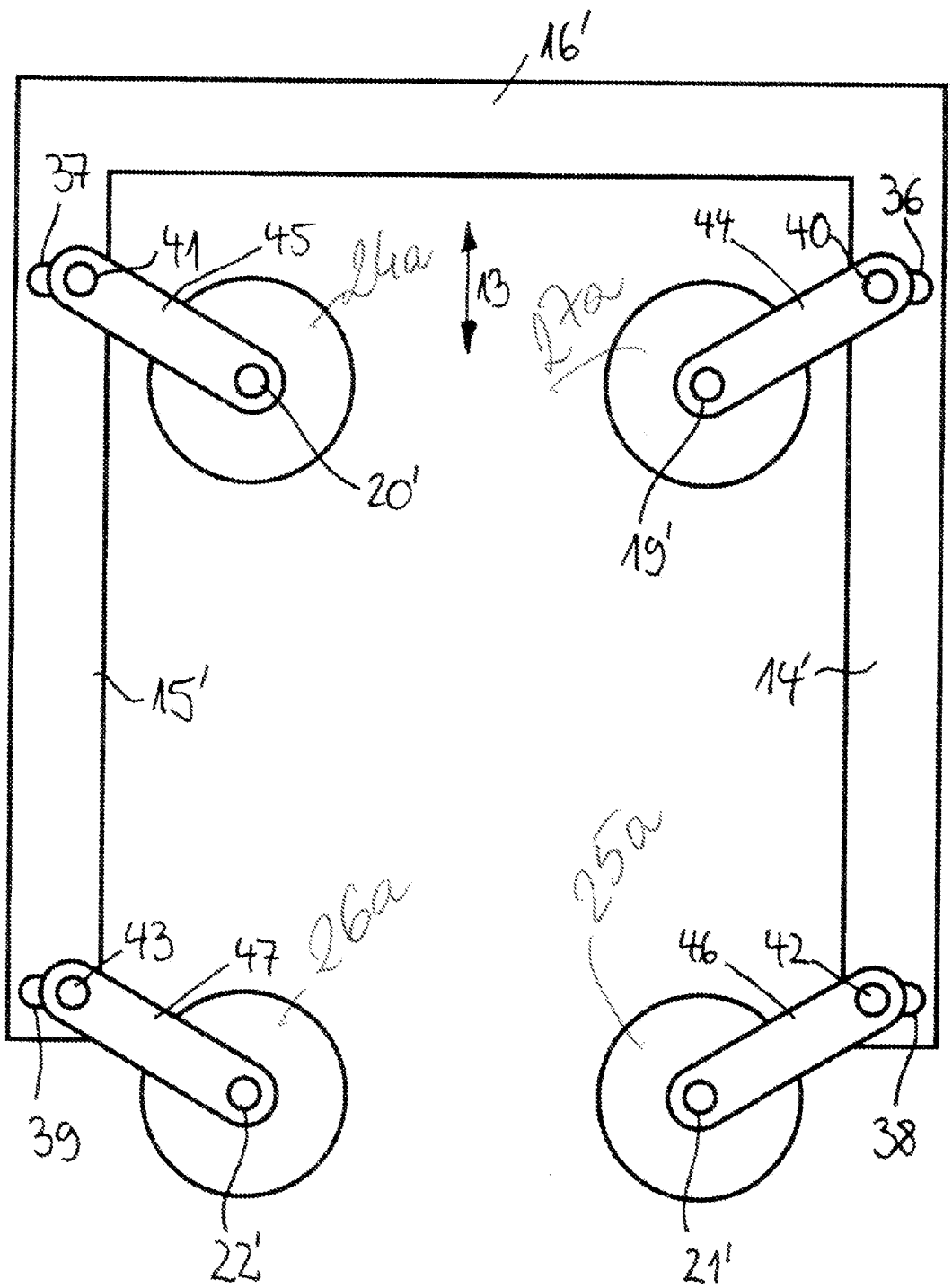
FIG. 8: is a partial top plan view of a second embodiment of an actuating device usable in a system according to the invention in which two thrust rods comprising a slotted guide system can drive rotatably mounted levers.

The actuating drive 12 has an electric motor comprising a stator 32 connected to the mounting and a rotor not shown in any greater detail in the figure which drives a further recirculating ball nut 34 of a further motion converter device 35 arranged on a further recirculating ball spindle 33. Said recirculating ball nut 34 is axially fixed relative to the stator 32 so that the recirculating ball spindle 33 is moved in sliding direction 13 relative to the mounting when the recirculating ball nut 34 is actuated by the rotor. The rotary movement of the rotor is thereby converted into a linear movement. To control the valve pins 2, the electric motor is connected to an electrical drive control device not shown in any greater detail in the figure which controls the electric motor such that the valve pins are positioned in a predetermined first position in the open position and in a predetermined second position in the closed position. Also thrust rods 14', 15' are arranged parallel to each other and connected together in an approximate U-shape by a cross bar 16' in the embodiment shown in FIG. 8. By means of an actuating drive not depicted in any greater detail in FIG. 8, the sliding mechanism formed by the thrust rods 14', 15' and the cross bar 16' can be displaced in sliding direction 13 extending at a right angle to the longitudinal extension of the valve pins relative to the mounting.

Converting the translational movement of the thrust rods 14', 15' into the rotational movement of the rotary elements 19', 20', 21', 22' is effected by means of a slotted guide system running transverse to the sliding direction 13 which comprises a respective guide slot 36, 37, 38, 39 extending transverse to the sliding direction 13 on the thrust rods 14', 15' for each rotary element 19', 20', 21 ', 22' driven by the respective thrust rod 14', 15' in which a guide element 40, 41, 42, 43 distanced from the axis of the respective rotary element 19', 20', 21', 22' engages in drive connection with the rotary element 19', 20', 21', 22' by means of a lever 44, 45, 46, 47. The rotary elements 19', 20', 21', 22' are each connected to the support plate 11 via motion converter devices. The motion converter devices can be configured as balls screws as in the embodiment depicted in FIGS. 1, 2 and 3 to 6.

Figure 9:
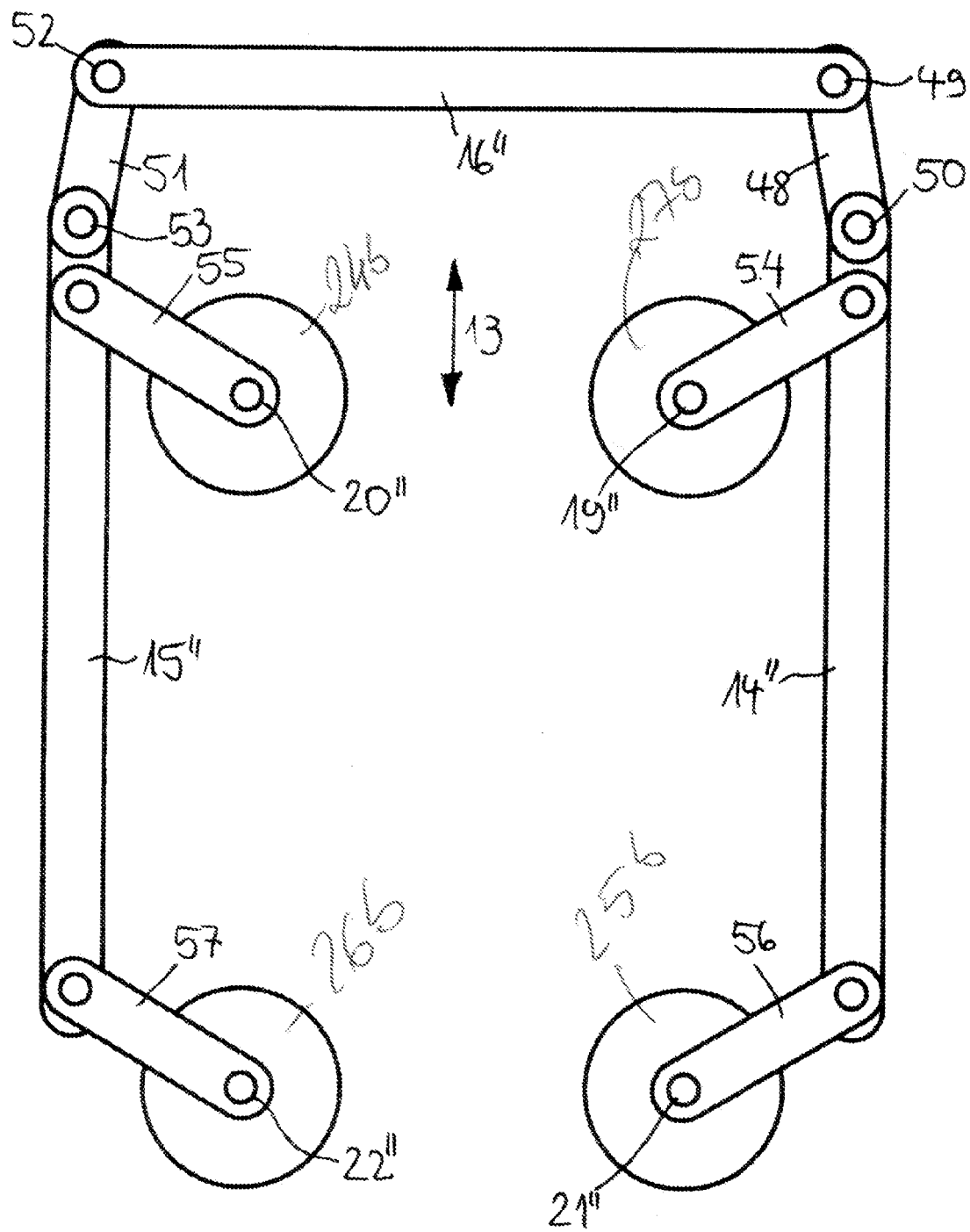
FIG. 9: is a partial top plan view of a third embodiment of an actuating device usable in a system according to the invention.

As can be recognized from FIG. 9, the cross bar 16" can also be articulated to the thrust rods 14", 15" by means of the respective intermediate element 48, 49. A first intermediate element 48 is thereby connected to cross bar 16" by means of a first joint 50 and to the first thrust rod 14" by means of a second joint 51 distanced from the pivot axis of the first joint 50. Correspondingly, a second intermediate element 51 is connected to cross bar 16" by means of a third joint 52 and to the second thrust rod 15" by means of a fourth joint 53 distanced from the pivot axis of the third joint 51. Converting the translational movement of the thrust rods 14", 15" into the rotational movement of the rotary elements 19", 20", 21", 22" is effected by means of connecting rods 54, 55, 56, 57, each respectively connected at points distanced from one another to their associated thrust rods 14", 15" on the one side and to their associated rotary elements 19", 20", 21", 22" on the other. When the thrust rods 14", 15" are moved in sliding direction 13, the distance between thrust rods 14", 15" changes.

Figure 11:
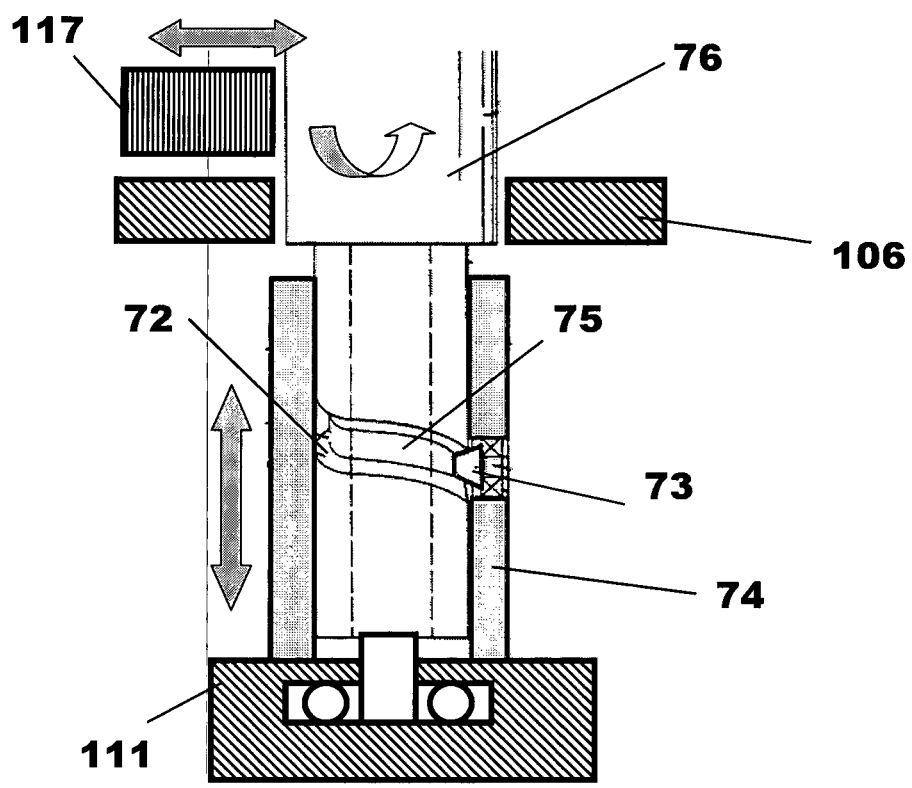
FIG. 11: is a side schematic view of a motion converter device usable in a system according to the invention comprising a shaft with a cam track having inclined planes.

In a further embodiment of the invention depicted in FIG. 11, the ball screw is replaced by a cam mechanism. A groove 75 on a rotatable shaft 76 exhibits inclined planes 72 which form a cam track.

A truncated conical driver roller 73 which engages in the cam track is rotatably mounted to the inner wall of a follower sleeve 74. A cylindrical driver roller 73 which interacts with complementary inclined planes of the cam track can also be provided in place of the truncated conical driver roller 73. However, the truncated conical driver roller 73 prevents increased slippage between driver roller 73 and cam track and thereby reduces friction.

In the present embodiment, the sliding movement of the sliding mechanism 117 effects a rotation of shaft 76 and the translational movement of the follower sleeve 74 induces an up and down movement of the support plate 11 relative to the stationary retaining plate 106 and the mold cavities 78, 79.

Figure 10:
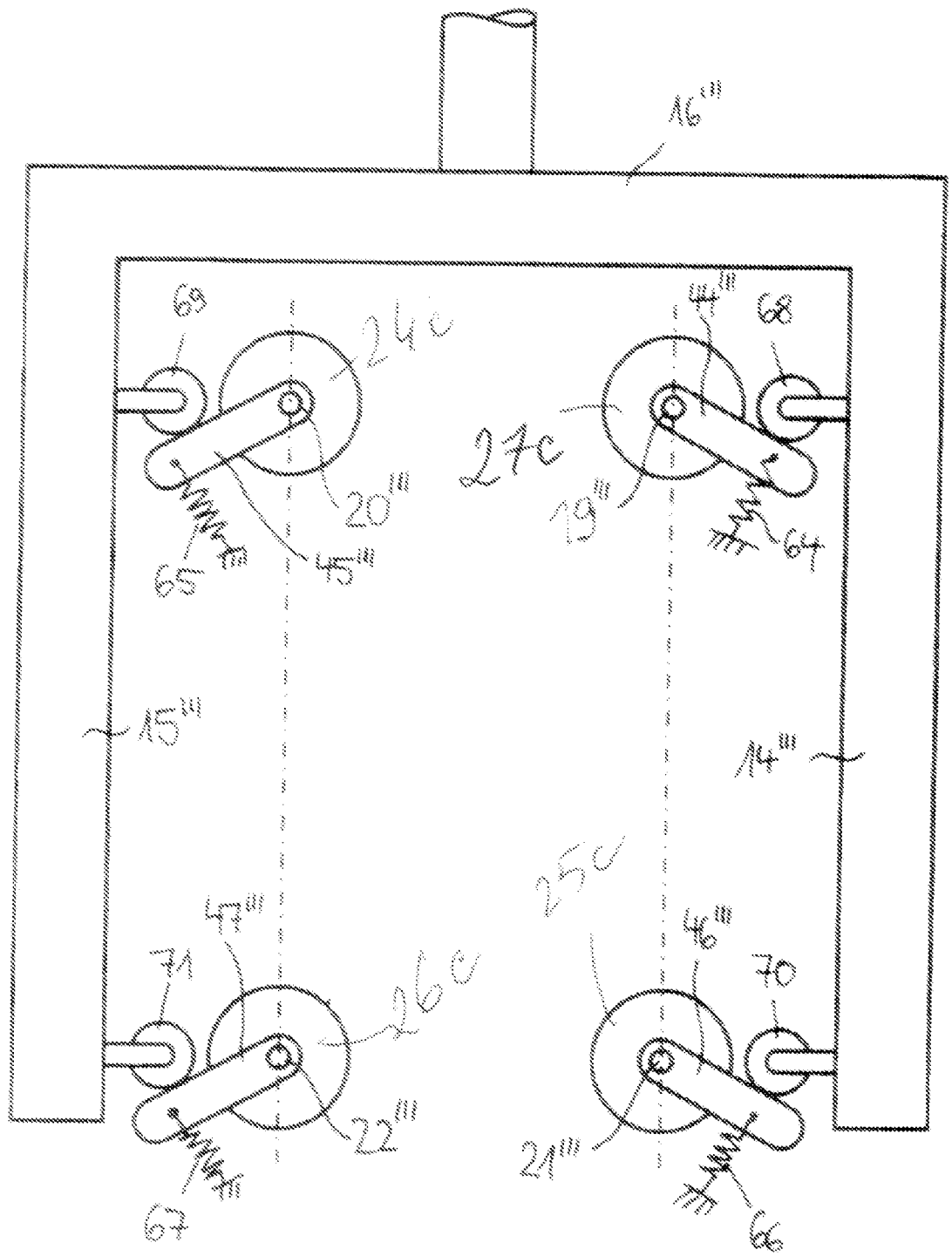
FIG. 10: is a partial top plan view of a fourth embodiment of an actuating device usable in a system according to the invention.

The thrust rods 14''', 15''' are also arranged parallel to one another and connected together in a somewhat U-shape by a transverse rod 16''' in the embodiment depicted in FIG. 10. By means of an actuating device not depicted in any greater detail in FIG. 10, the sliding mechanism formed by the thrust rods 14''', 15''' and the cross bar 16''' can be displaced in a sliding direction 13 running at a right angle to the longitudinal extension of the valve pins relative to the mounting.

Yet there is no direct coupling between the arms 44''', 45''', 46''', 47''' and the sliding mechanism 14''', 15''', 16'''. The arms 44''', 45''', 46''', 47''' are continuously pressed against small rollers 68, 69, 70, 71 arranged on the thrust rods 14''', 15''' by means of spring elements 64, 65, 66, 67. The spring elements 64, 65, 66, 67 are in each case supported at their one end against the respective arm 44''', 45''', 46''', 47''' and at their other end against a bearing point.

This design is also suitable for the cam rotation mechanism shown in FIG. 11. The cam track can thereby exhibit a stepped profile so that a small movement of the sliding mechanism 14''', 15''', 16''' can be used to move the support plate 11 by about 3 mm to 10 mm and open the valve pins 2 of the hot runner nozzles. In this case, the support plate 11 can be a frame formed of rigid but lightweight tubes/rods (which can be extruded as applicable). Such a lightweight and rigid frame structure is more easily moved by the cam rotation mechanism shown in FIG. 11.

Figure 12:
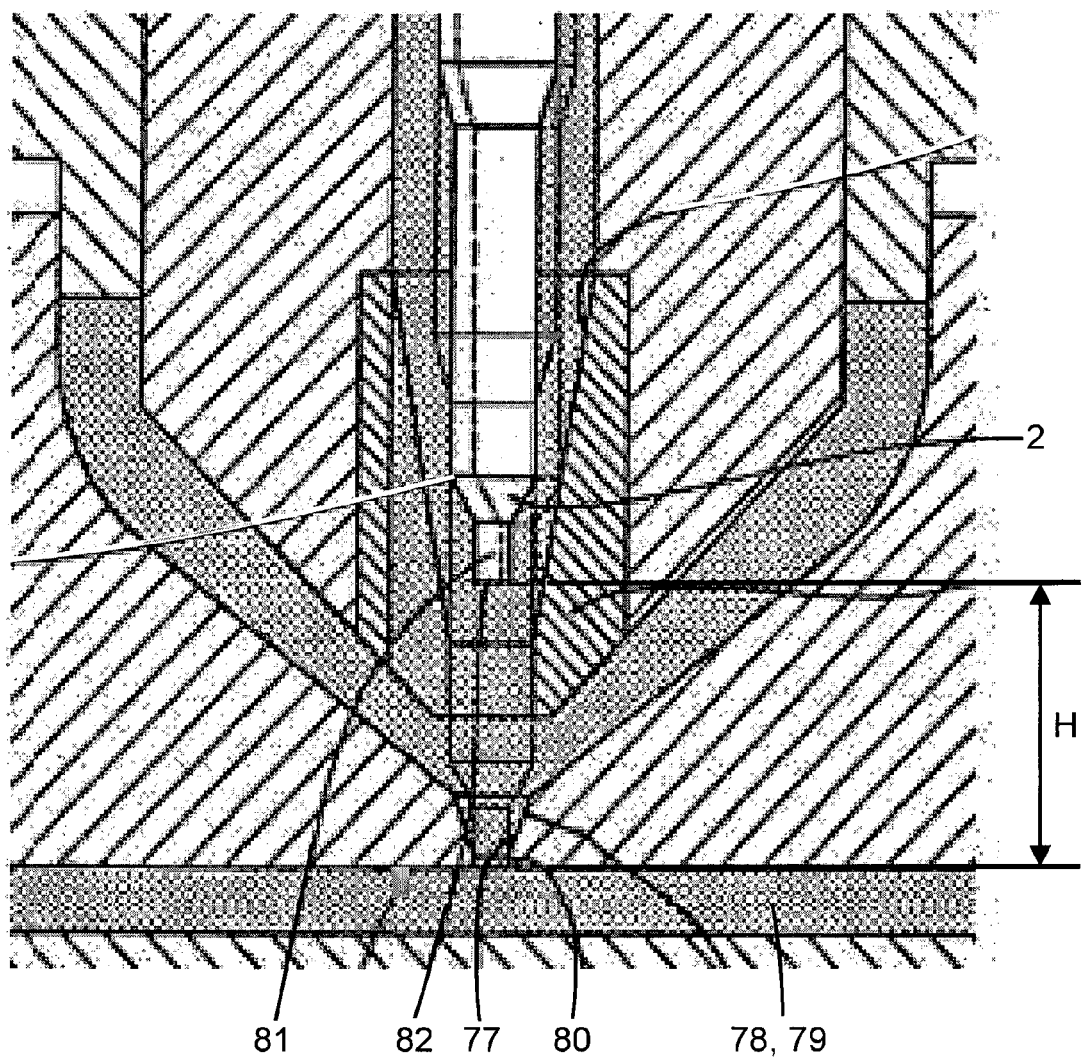
FIG. 12: is a partial longitudinal sectional view through a hot runner nozzle usable in a system according to the invention as depicted in FIGS. 1-11.

In the embodiment depicted in FIG. 12, the valve pins 2 exhibit a cylindrical section 81 on their free end region distant from the support plate 11 which can be positioned in the outlet opening 80 of the hot runner nozzle 8. By means of the adjusting device, the valve pins 2 can be displaced between a first position shown in FIG. 12, in which the outlet openings 80/hot runner nozzles 8 are fully open, and a second position in which the outlet openings 80/hot runner nozzles 8 are completely closed. In the second position, the valve pins 2 have been moved by stroke H respective the first position toward the mold cavity 78, 79. The valve pins 2 can be positioned into one or more intermediate positions between the first position and the second position in controlled manner.

Figure 13:
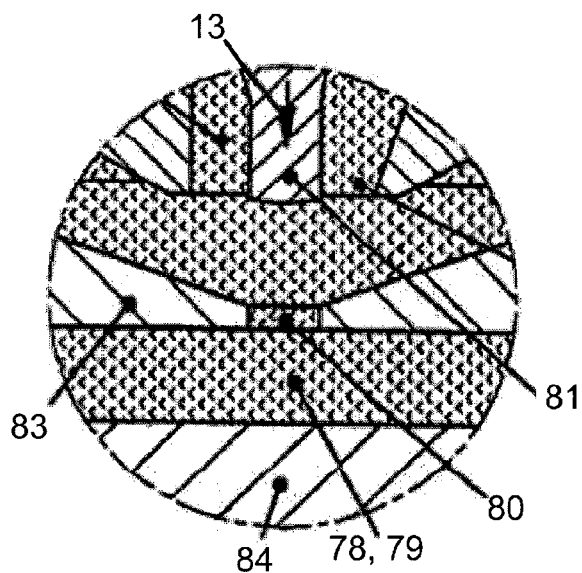
FIGS. 13 through 15: are partial longitudinal enlarged sectional views of a distal end of a nozzle usable in a system according to FIGS. 1-12 showing the area around the downstream outlet opening of the hot runner nozzle with the valve pin disposed in sequentially different downstream driven positions from FIG. 13 to FIG. 15.
Figure 14:
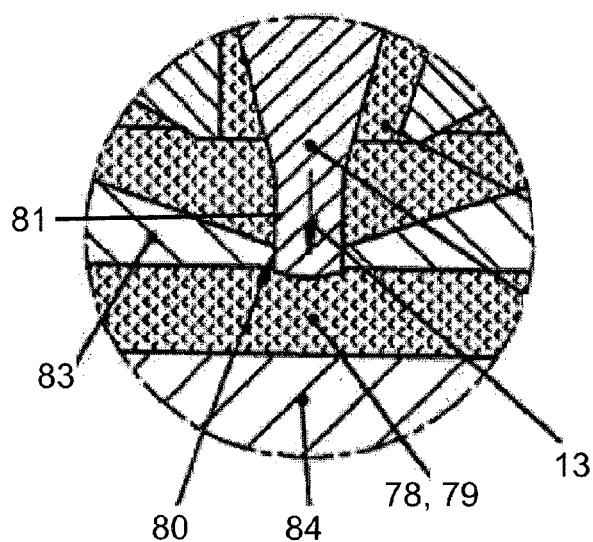
Figure 15:
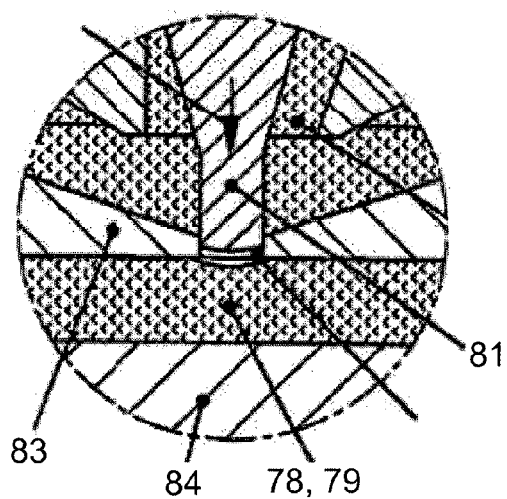

Recognizable from FIG. 13 is that to advance the melt into the mold cavities 78, 79, the outlet openings 80 of the hot runner nozzles 8 first need to be fully opened by the valve pins 2 being brought into a first position in which the free ends 82 of the valve pins 2 are distanced from the valve seats 77. As soon as the mold cavities 78, 79 are completely filled with melt, the valve pins 2 are brought into a second position shown in FIG. 14 in which the cylindrical sections 81 of the valve pins 2 close their associated outlet opening 80. The valve pins 2 thereby enter through the outlet openings 80 and their respective free ends 82 protrude somewhat over the adjacently disposed wall of the mold part 83 into the mold cavity 78, 79. This action results in a clean gate mark on the molded part. After the melt within the mold cavities 78, 79 has cooled enough to where the molded parts can be removed from the mold cavity 78, 79, the valve pins 2 retract somewhat and are brought into a third position shown in FIG. 15 in which the cylindrical sections 81 of the valve pins 2 still close outlet opening 80 but the free ends 82 of the valve pins 2 are no longer protruding into the mold cavities 78, 79. The mold parts 83 are brought into the open position in this valve pin position and the molded parts are removed from the mold cavity 78, 79.

Figure 16:
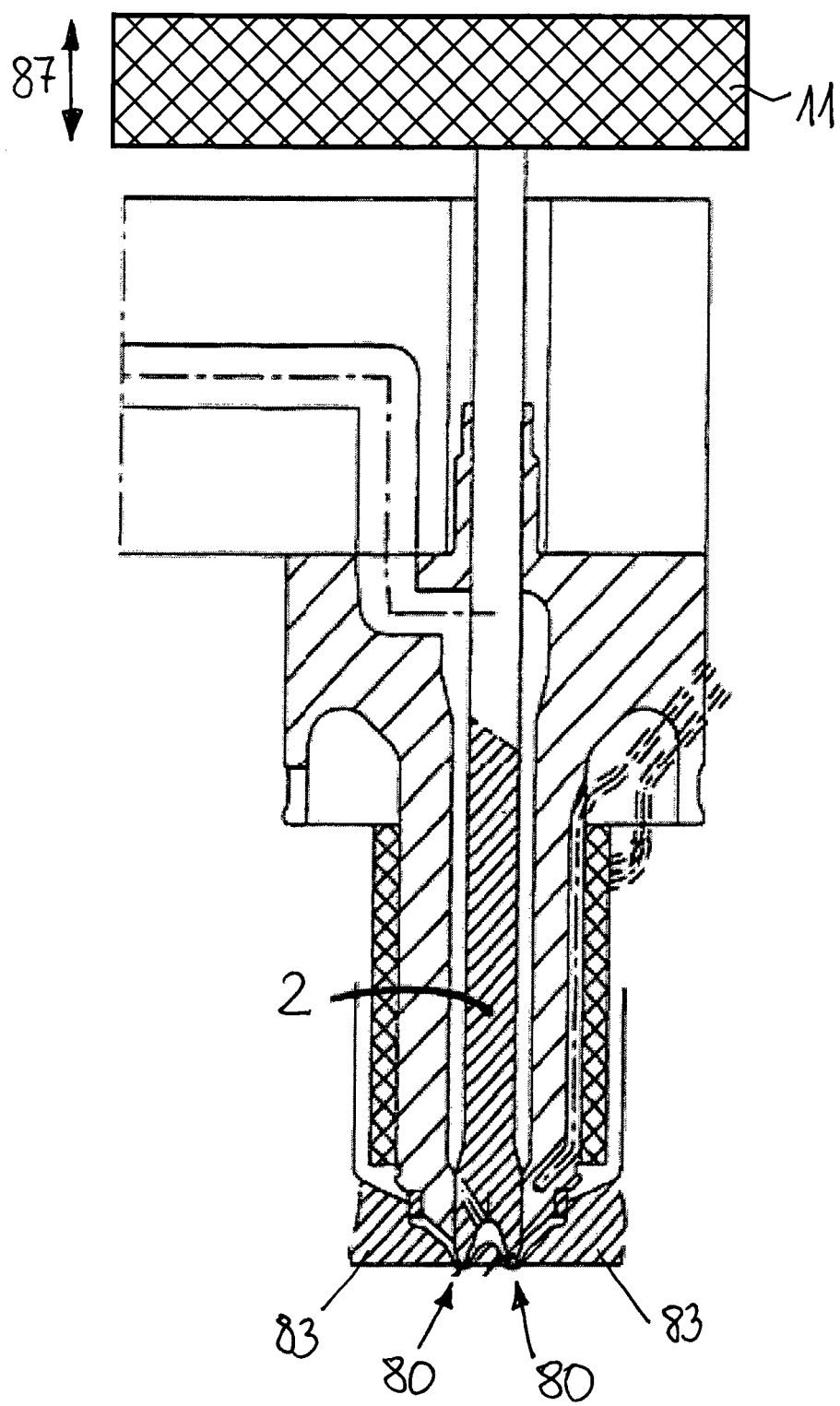
FIG. 16: is a side longitudinal sectional view through a hot runner nozzle usable in a system according to the invention as shown for example in FIGS. 1-12.
Figure 17:
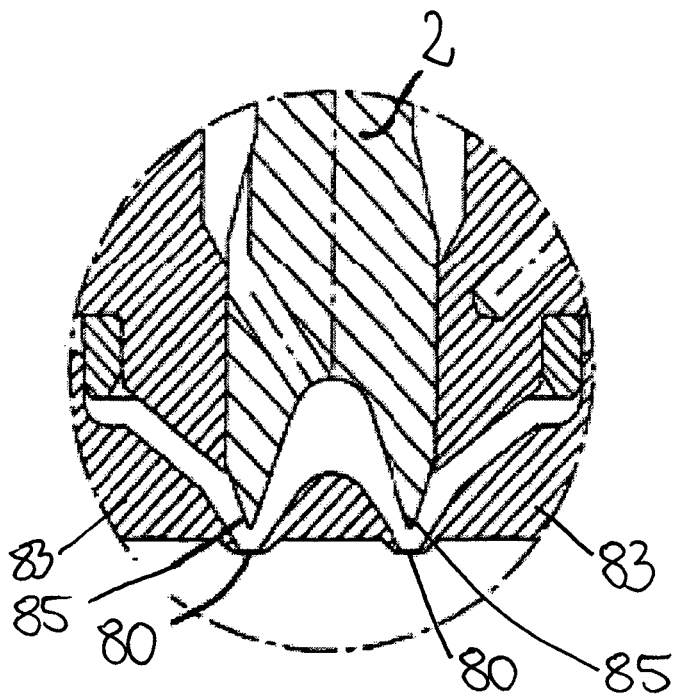
FIG. 17: is an enlarged side sectional detail view of the hot runner nozzle shown in FIG. 16 in the area of the outlet opening, wherein the valve pin of the hot runner nozzle is disposed in a first open position.

In the embodiment shown in FIG. 16, the hot runner nozzles 8 are each designed as open injection molding nozzles having a valve pin 2 affixed to the support plate 11, provided with a plurality of pin tips 85 at their mold-side ends, for example three evenly spaced tips. The pin tips 85 are conical shaped and protrude into likewise conical outlet openings 80 such that annular gaps result in said outlet openings 80 through which the injection molding material can be injected into the mold cavity 78, 79.

Figure 18:
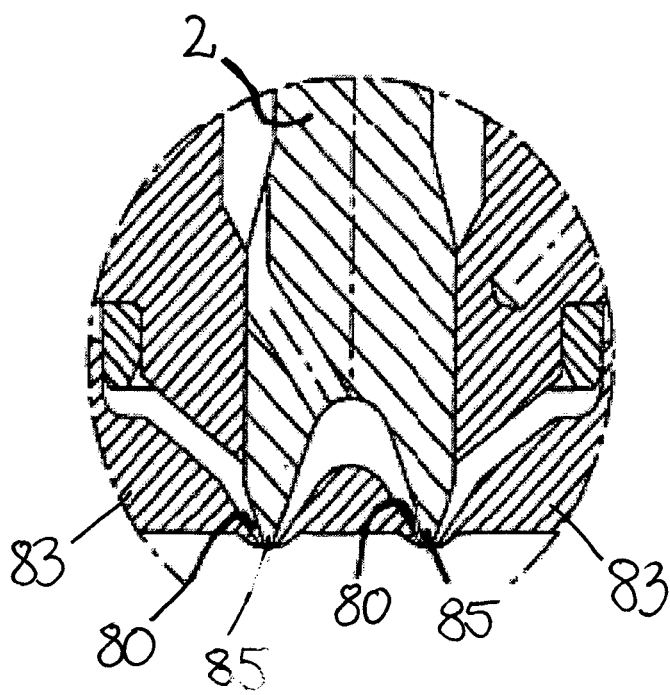
FIG. 18: is a view similar to FIG. 17 wherein the valve pin is disposed in a second closed position.

The valve pins 2 can be displaced by moving the support plate 11 in the direction of their longitudinal extension and can be moved from a first position, shown in FIG. 16, into a second position, shown in FIG. 18, toward the mold cavity 78, 79 in order to reduce the annular gap cross sections in the region of the pin tips, the outlet openings 80 provided there respectively. Upon the valve pins 2 retracting from the second into the first position, the annular gaps of outlet openings 80 even give way to an approximate circular outlet opening 80 after the retraction of the valve pins 2 at the actual inlet into the mold cavity 78, 79 which does not become an annular gap again until the pin tips are moved back into the second position.

Figure 19:
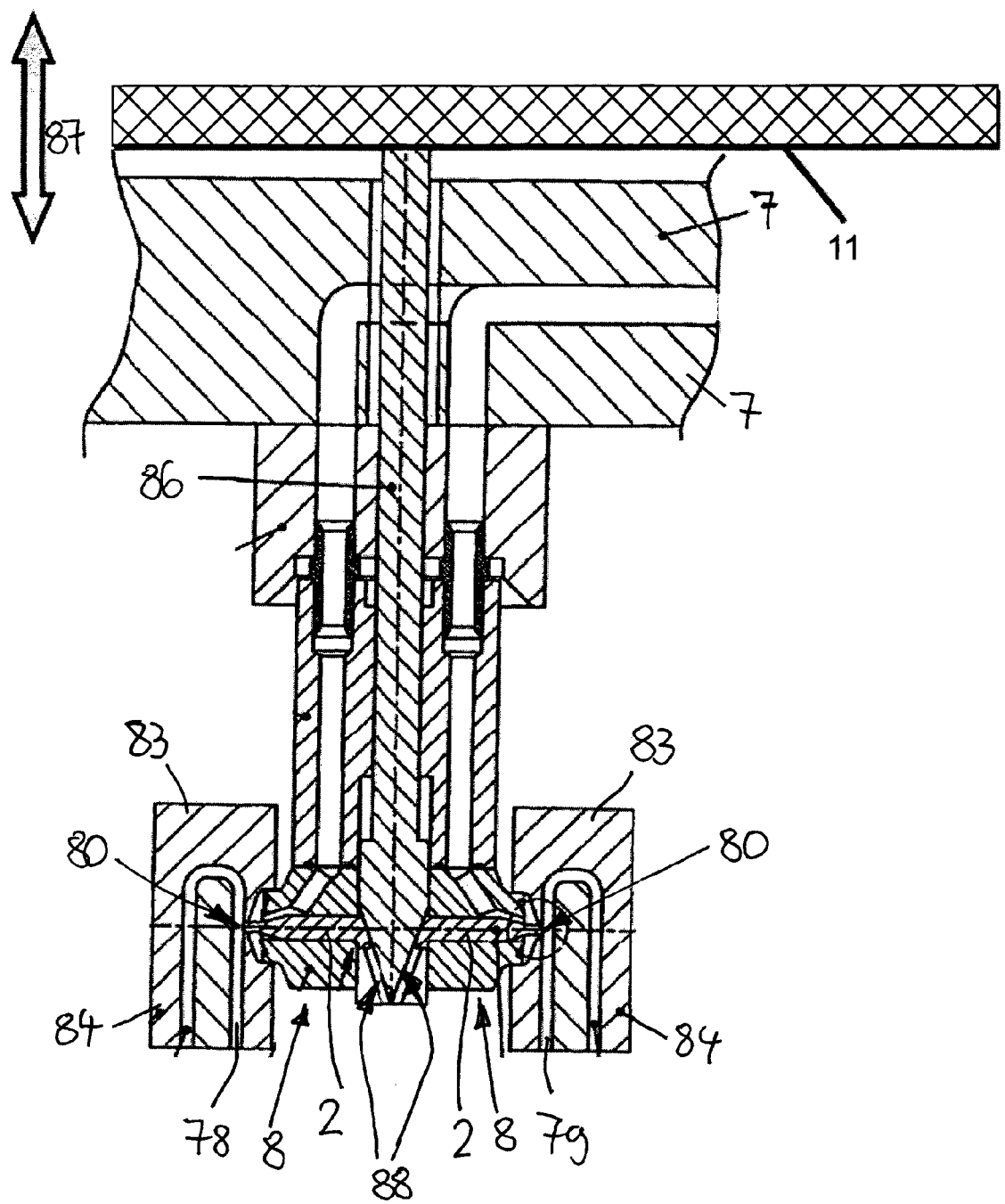
FIG. 19: is a partial side longitudinal sectional view through a hot runner system according to the invention having hot runner nozzles with outlet openings pointing in different directions for use in the system embodiments of FIGS. 1-12.

In the embodiment shown in FIG. 19, the support plate 11 holds a plurality of rod-shaped adjusting means 86 extending parallel to one another and parallel to the first direction 87. As in the previously described embodiments in which the support plate 11 bears the valve pins 2, the support plate 11 in the embodiment shown in FIG. 16 is also mounted to the mounting to be displaceable back and forth in a first direction 87 relative to the retaining plates 3, 4, 5, 6 along said first direction 87 by means of the actuator 12, the sliding mechanism 14, 15, 16, the engaging or connecting mechanism 60, 61, 62, 63, the rotary mechanisms 23, 24, 25, 26 and the reciprocating mechanism 27. The first direction is thereby disposed parallel to the adjusting means 86. Thus, the statements made with respect to the previously described embodiments also apply analogously to the embodiment depicted in FIG. 16.

Each adjusting means 86 is allocated two respective hot runner nozzles 8 arranged on the manifold 7 having outlet openings 80 pointing in different directions. As can be seen in FIG. 19, the valve pins 2 of these hot runner nozzles 8 point with their free ends in to each other opposite directions. The valve pins 2 are mounted in the hot runner nozzles 8 to be displaceable to and from the adjusting means 86.

The valve pins 2 are each in drive connection with their associated adjusting means 86 such that the closing force can be transmitted via the support plate 11 and the adjusting means 86 to the valve pins 2. The adjusting means 86 has a respective inclined plane 88 for each of the valve pins 2 allocated to it at an end region distanced from the support plate 11, on which the end of said valve pin 2 distanced from the mold cavity 78, 70 associated with said respective valve pin 2 comes to bear. When the valve pins 2 are in their open position and the support plate 11 is moved along the double arrow 87 toward the valve pins 2, the valve pins 2 are displaced by the adjusting means 86 and each shifted in the direction of their closed position.

The invention claimed is:

1. A hot runner system for the simultaneous injection molding of a plurality of parts in separate mold cavities comprising:
   an injection molding manifold having an inlet opening for receipt of the injection fluid,
   a plurality of nozzles communicating with one or more flow channels in the manifold, each nozzle having a valve pin for controlling the flow of melt from the nozzles to one or more mold cavities,
   a support plate or a support frame that supports the plurality of valve pins or adjusters for the valve pins, said support plate or support frame being movable along a first direction in order to simultaneously move the valve pins or adjusters relative to the one or more mold cavities,
   an actuator for displacing the support plate or support frame and for generating a valve pin closing force along a first direction toward the one or more mold cavities, said actuator comprising a torque generating structure having an electrical component, a rotary mechanism drivable by the electrical component and a thrust arm directly coupled to the rotary mechanism and movable along a second direction,
   a sliding mechanism arranged external of the actuator coupled to the thrust arm of the actuator, wherein the sliding mechanism is movable along the second direction and interconnected to a stationary plate or a stationary frame, wherein the sliding mechanism comprises rigid components in order to transmit the closing force along the second direction,
   an engaging or connecting mechanism directly interconnected to the sliding mechanism and comprising at least two separate engaging or connecting structures,
   a plurality of rotary mechanisms each comprising at least one rotary element supported on the stationary plate or stationary frame, wherein the rotary elements are interconnected to at least two engaging or connecting structures to convert the linear movement of the sliding mechanism into a plurality of simultaneous rotary movements in order to direct the closing force along the first direction,
   a reciprocating mechanism fixed to the support plate or support frame, wherein the reciprocating mechanism is directly coupled to the rotary elements in order to effect movement of the support plate or support frame along the first direction such that a force for simultaneous movement of the valve pins or adjusters along the first direction by way of the support plate or the support frame can be generated by the actuator and transmitted by the rigid components of the sliding mechanism via a translational movement coupled with rotation to distribute the closing force to the plurality of rotary elements which have rotational axes generally coaxial with an axis of the valve pins or adjusters.

2. The hot runner system according to claim 1, wherein the actuator is comprised of an electric motor or a drive control device such that the valve pins can be positioned in at least one third position disposed between a first position and a second position and can be held as needed in said third position.

3. The hot runner system according to claim 1 wherein the valve pins comprise a cylindrical section at a free end region distant or distal relative to the support plate which interacts with a corresponding valve seat of a respective hot runner nozzle such that flow through a nozzle is closed when an associated valve pin is disposed in either the second position or the third position of the valve pins.

4. The hot runner system according to claim 1, wherein the valve pins are arranged in the mold cavities by a free end that is distant or distal relative to the support plate in the second position and are arranged completely external of the mold cavities in the third position.

5. The hot runner system according to claim 1, wherein the valve pins each have a section which tapers, preferably conically or in cone-shaped manner, toward a free end of the valve pins on a free end region distant or distal relative to the support plate.

6. The hot runner system according to claim 1, wherein at least two nozzles have outlet openings arranged to route injection fluid along different directions and valve pins arranged along different directions, wherein said valve pins are in drivably interconnected to an adjuster such that the closing force is transmittable from the adjuster to the valve pins.

7. The hot runner system according to claim 1, wherein the rotary mechanism comprises a sleeve having a helical cam follower slot or a ball nut or a re-circulating ball nut.

8. The hot runner system according to claim 7, wherein the reciprocating mechanism comprises a spindle having a helical track and a ball screw.

9. The hot runner system according to claim 1, wherein the engaging or connecting mechanism comprises a gear rack.

10. The hot runner system according to claim 1, wherein the engaging or connecting mechanism comprises a lever arm.

11. A method of simultaneously molding a plurality of parts from two or more mold cavities, the method comprising injecting an injection fluid into the two or more mold cavities in a hot runner system comprised of:
    an injection molding manifold having an inlet opening for receipt of the injection fluid,
    a plurality of nozzles communicating with one or more flow channels in the manifold, each nozzle having a valve pin for controlling the flow of melt from the nozzles to one or more mold cavities,
    a support plate or a support frame that supports the plurality of valve pins or adjusters for the valve pins, said support plate or support frame being movable along a first direction in order to simultaneously move the valve pins or adjusters relative to the one or more mold cavities,
    an actuator for displacing the support plate or support frame and for generating a valve pin closing force along a first direction toward the one or more mold cavities said actuator comprising a torque generating structure having an electrical component, a rotary mechanism drivable by the electrical component and a thrust arm directly coupled to the rotary mechanism and movable along a second direction,
    a sliding mechanism arranged external of the actuator coupled to the thrust arm of the actuator, wherein the sliding mechanism is movable along the second direction and interconnected to a stationary plate or a stationary frame, wherein the sliding mechanism comprises rigid components in order to transmit the closing force along the second direction,
    an engaging or connecting mechanism directly interconnected to the sliding mechanism and comprising at least two separate engaging or connecting structures, a plurality of rotary mechanisms each comprising at least one rotary element supported on the stationary plate or stationary frame, wherein the rotary elements are interconnected to at least two engaging or connecting structures to convert the linear movement of the sliding mechanism into a plurality of simultaneous rotary movements in order to direct the closing force along the first direction, a reciprocating mechanism fixed to the support plate or support frame, wherein the reciprocating mechanism is directly coupled to the rotary elements in order to effect movement of the support plate or support frame along the first direction such that a force for simultaneous movement of the valve pins or adjusters along the first direction by way of the support plate or the support frame can be generated by the actuator and transmitted by the rigid components of the sliding mechanism via a translational movement coupled with rotation to distribute the closing force to the plurality of rotary elements which have rotational axes generally coaxial with an axis of the valve pins or adjusters.

* * * * *